United States Patent [19]

Nakamura et al.

[11] Patent Number: 5,636,949

[45] Date of Patent: Jun. 10, 1997

[54] MULTI-FUNCTION MACHINE TOOL

[75] Inventors: Kosei Nakamura; Kazuhisa Numai; Hisashi Maeda, all of Yamanashi, Japan

[73] Assignee: Fanuc, Ltd., Yamanishi, Japan

[21] Appl. No.: 577,939

[22] Filed: Dec. 22, 1995

[30] Foreign Application Priority Data

Dec. 26, 1994 [JP] Japan .................... 6-322751

[51] Int. Cl.$^6$ ........................................ B23C 9/00
[52] U.S. Cl. ................ 409/230; 408/239 A; 409/231; 483/31
[58] Field of Search ........................... 409/231, 232, 409/233, 234, 235; 483/31; 310/54, 90; 408/234, 238, 239 A, 239 R; 451/177, 906

[56] References Cited

U.S. PATENT DOCUMENTS

| | | | |
|---|---|---|---|
| 3,725,595 | 4/1973 | Wotthac et al. | 409/235 |
| 4,077,736 | 3/1978 | Hutchens | 409/231 X |
| 4,167,218 | 9/1979 | Horiuchi et al. | 409/233 |
| 4,534,686 | 8/1985 | Nakamura et al. | 409/231 |
| 4,583,894 | 4/1986 | Mitchell | 409/233 |
| 4,836,723 | 6/1989 | Flammini | 409/233 |
| 4,869,626 | 9/1989 | Kosmowski | 409/231 X |
| 4,925,348 | 5/1990 | Krüsi | 409/231 |

*Primary Examiner*—William R. Briggs
*Attorney, Agent, or Firm*—Nikaido Marmelstein Murray & Oram LLP

[57] ABSTRACT

A multi-function machine tool provided with a motor-driven spindle on which each of a plurality of sub-motor units having individual drive motors and tools, respectively, can be removably mounted to perform a plurality of machining operations in order to comply with a change in the machining conditions and a change in the material of workpieces to be machined. The drive motors of the sub-motor units exert different output performances, i.e., different rated rotating speeds and different output torques, and can be electrically connected to the electric powers lines and control signal lines provided for the spindle head.

7 Claims, 3 Drawing Sheets (SEPARATED STATE)

(CONNECTED STATE)

MULTI-FUNCTION MACHINE TOOL

BACKGROUND OF THE INVENTION

1. Field of the Invention

The present invention relates to a multi-function machine tool provided with a single spindle head having a rotating spindle to which a plurality of different sub-motor units are changeably attached in response to a change in the machining operations to be applied to a workpiece, the machining conditions, and the kind of material of the workpiece. Each sub-motor unit accommodates therein a tool for an intended machining operation such as milling operation, boring operation or grinding operation, and a drive motor for driving the tool at a predetermined rotating speed and a predetermined output torque.

2. Description of the Related Art

It is well known that a machine tool, particularly a milling machine, is provided with a spindle head having a spindle which is rotated at a selected speed to effect diverse kinds of machining operations, such as a milling operation, a grinding operation and a boring operation, by the use of tools changeably attached to the end of the spindle. The spindle head is provided with a drive motor mounted on the top thereof or built in the housing thereof for driving the rotation of the spindle together with the tool attached thereto.

A machine tool with an automatic tool changer has been also known and used. The automatic tool changer, having a tool magazine storing therein a plurality of diverse tools, can automatically change a tool attached to the end of a spindle of the machine tool to a different tool selected from the plurality of tool stored in the magazine. Thus, the machine tool with the automatic tool changer can perform a plurality of different machining operations often automatically changing a tool, attached to the spindle, to another tool selected from the tools stored in the magazine of the automatic tool changer.

Further, a more fully automated machine tool, referred to as a machining center, is well known and is a completely automated machine tool which is capable of conducting a plurality of machining operations according to a stored program and by using one of a plurality of tools changed by an automatic tool changer.

In the described known machine tools, a drive motor, i.e., a spindle motor for driving the rotation of the spindle, consists of a servo motor which exhibits a predetermined rated speed and a predetermined rated output power designed in accordance with the expected use of the machine tool. Nevertheless, either when the kind of material of the workpiece to be machined by the machine tool greatly changes or when the operating condition of the machine tool in which a workpiece is machined greatly vary, the single spindle motor rotationally driving the spindle cannot adequately operate so as to comply with large changes and variations. Namely, when a workpiece made of a non-free-cutting metallic material such as iron-system metal is machined by a machine tool, the spindle motor must be able to exhibit a large output torque at a relatively low rotating speed. On the other hand, when a workplace made of a soft free-cutting material such as aluminum or plastic is machined, the spindle motor must be able to rotate the spindle at a very high speed. Thus, the operating conditions required for the spindle motor are different from one another and, accordingly, it is usually impossible for one single spindle motor to appropriately operate at many different operating conditions.

Further, during machining operations by the machine tool, it is often required that the same workplace receives both rough machining and finish-machining by the same machine tool. However, the single drive motor of the machine tool cannot drive the spindle at both rough machining and finish-machining speeds and different output torques.

From the viewpoint of increasing machining efficiency of a machine tool, a tool is required to be driven, in some cases, by a drive motor having a high acceleration performance and, in other cases, by a different drive motor having a high deceleration performance. Obviously, one single drive motor mounted on the spindle head of a machine tool is unable to comply with such requirements. Nevertheless, the conventional machine tool is not provided with any means for supplement the performance of the spindle motor.

SUMMARY OF THE INVENTION

Therefore, an object of the present invention is to provide a multi-function machine tool provided with a spindle head having a motor-driven spindle to which can be changeably attached one of a plurality of different sub-motor units, each having an individual machining tool and a built-in drive motor for driving the machining tool at an individual drive condition.

Another object of the present invention is to provide a multi-function machine tool provided with a spindle head, a spindle, a spindle motor for driving the spindle at a predetermined drive condition, and a unit for changeably attaching, to the end of the spindle, one of a plurality of sub-motor units having a tool and a built-in drive motor driving the rotation of the tool at an individual drive condition different from the drive condition of the spindle motor, so that the machine tool may exhibit any one of a plurality of machining operations in response to a change in the conditions required for machining a workpiece.

In accordance with the present invention, there is provided a multi-function machine tool provided with a spindle head, a spindle rotatably received by the spindle head and having a front tool receiving end, and a spindle motor mounted on the spindle head for driving the rotation of the spindle, and adapted for use in combination with one of a plurality of sub-motor units, each having a tool held at a front end thereof for machining a workpiece, a tool mount provided at a rear end thereof, a built-in drive motor driving the tool at an individual drive condition to conduct one of a plurality of machining operations, and an electric connector unit for receiving electric power for the drive motor and for receiving and transmitting control signals, the multi-function machine tool comprising:

engaging means for being disengageably engaged with the tool mount of each of the plurality of sub-motor units so that each of the plurality of sub-motor units can be mounted on the spindle; and an electric connector means arranged at a position adjacent to an end of the spindle head so as to be mechanically and electrically connected to the electric connector unit of each of the plurality of sub-motor units.

Preferably, each of the plurality of sub-motor units is provided with a hollow housing receiving the drive motor therein, and rotatably supporting a tool-holding shaft to hold the tool, the housing having an internal axial air-path being substantially in alignment with the spindle for introducing a flow of cooling air supplied through the spindle head of the multi-function machine tool into a working portion of the tool of each sub-motor unit.

In operation, when it is required that a workpiece is machined by a tool driven at a drive condition different from that of the spindle motor, one of the plurality of sub-motor units may be selected and attached to the end of the spindle so that the drive motor of the selected sub-motor unit drives the rotation of the tool at a drive condition, including a rotating speed of the tool and an output power applied to the tool, in compliance with a required machining condition. Thus, the tool of the sub-motor unit is used for conducting machining of a workpiece at the most optimum machining condition, without use of the spindle motor.

BRIEF DESCRIPTION OF THE DRAWINGS

The above and other objects, features and advantages of the present invention will be made more apparent from the ensuing description of the preferred embodiment in conjunction with the accompanying drawings wherein.

DESCRIPTION OF THE PREFERRED EMBODIMENTS

Figure 1:
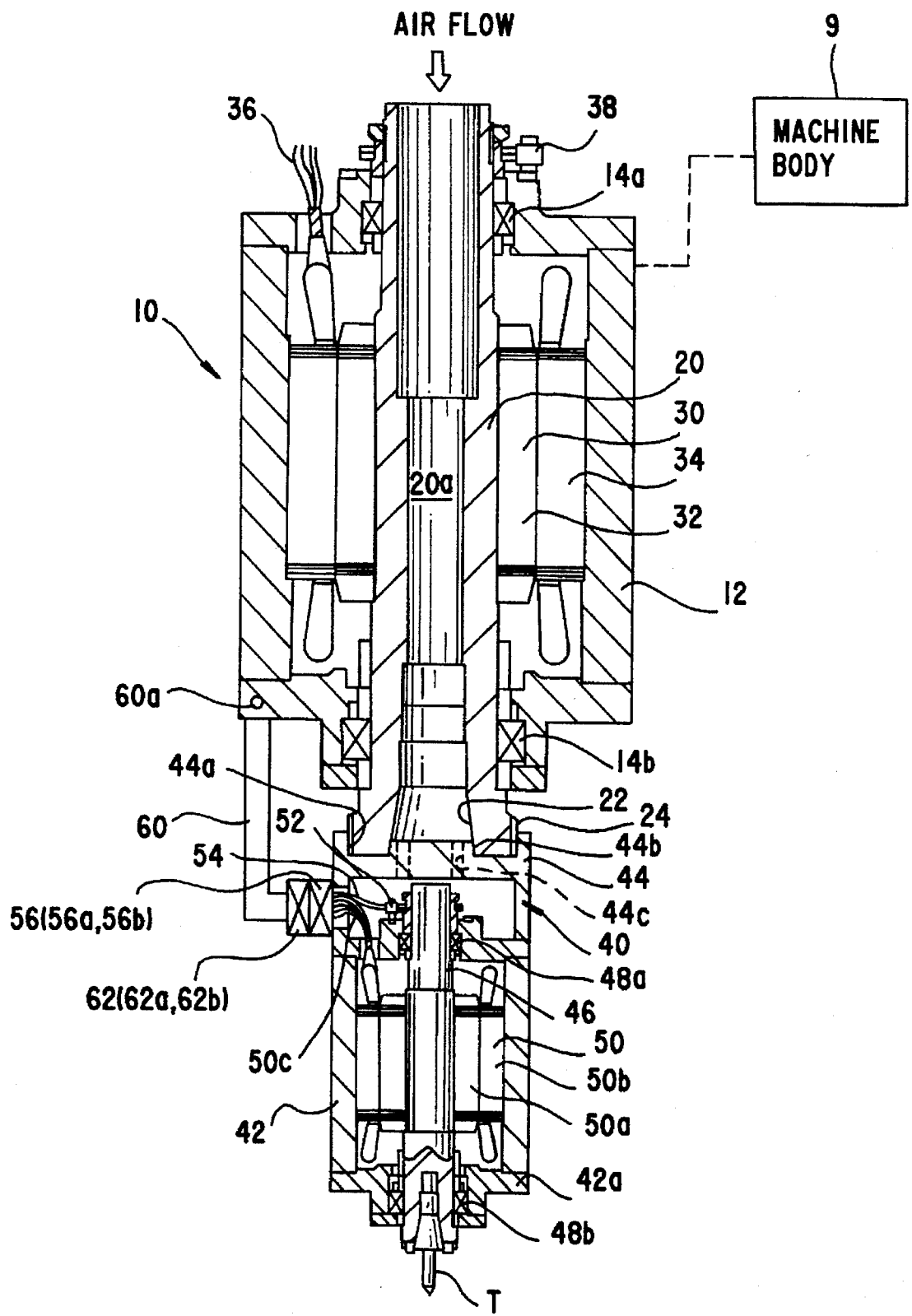
FIG. 1 is a cross-sectional view of a spindle head and a spindle of a multi-function machine tool according to an embodiment of the present invention, illustrating a state where one of a plurality of sub-motor units is attached to the end of the spindle.

Referring to FIG. 1, a spindle head 10 is held by a machine body 9 such as a vertical column of a multi-function machine tool, so as to be slid along an axis, e.g., a vertical axis. The spindle head 10 is provided with a housing 12 in which a spindle 20 is rotatably supported via upper and lower anti-friction bearings 14a and 14b. The housing 12 of the spindle head 10 also houses therein a drive motor 30 for driving the rotation of the spindle 20. The drive motor 30 includes a rotor 32 fixedly mounted on an intermediate portion of the spindle 20, and a stator 34 fixedly attached to an internal wall of the housing 12. The stator 34 has electric windings which are connected to an electric power supply line 36 supplying electric power from an external power supply source to the electric windings of the drive motor 30. The electric power supply line 36 is led out of the interior of the housing 12 via an aperture formed in the upper lid of the housing 12.

The spindle 20 rotatably held in the housing 12 of the spindle head 10 is formed as a hollow cylindrical shaft extending outward of the housing 12 beyond the upper bearing 14a and, accordingly, the spindle 20 can be supplied, from the upper most end thereof, with a cooling air which flows down to the lower most end of the spindle 20 via an internal air pathway 20a. The rotation of the spindle 20 can be detected by a speed detector 38 such as a known encoder device which is arranged at the upper most end of the housing 12.

The lowermost end of the spindle 20 is provided with a tapered bore 22 in which a tapered shank of a conventional tool (not shown) such as a milling cutter, a drilling cutter, and a grinding tool can be snugly fitted. The tool can be cooled by the cooling air supplied through the air pathway 20a. The lowermost end of the spindle 20 is also formed with external male screw-thread portion 24 with which a later described sub-motor unit 40 can be threadedly engaged.

The sub-motor unit 40 disengageably engaged with the male screw-thread portion 24 of the spindle 20 is provided with a hollow housing 42 having an open lower end closed by a lid member 42a, and an upper end covered by an end plate 44 having female screw-thread portion 44a formed therein so as to be engaged with the male screw-thread portion 24 of the spindle 20. The end plate 44 of the housing 42 also has a central projection 44b formed as a tapered projection capable of being snugly fitted into the tapered bore 22 of the spindle 20. The female screw-thread portion 44a and the central tapered projection 44b are coaxial with one another, and cooperate to allow the sub-motor unit 40 to be accurately mounted on the front end of the spindle 20. The end plate 44 is further provided with a plurality of through-holes 44c through which the cooling air can be introduced from the air pathway 20a of the spindle 20 into the hollow housing 42 of the sub-motor unit 40.

The sub-motor unit 40 is provided with a drive motor 50 built in the hollow housing 42 and a tool holding shaft 46 rotatably held by the housing 42 via two anti-friction bearings 48a and 48b arranged to be spaced apart from one another. Thus, the tool holding shaft 46 can be rotated by the drive motor 50. The tool holding shaft 46 has a front end to which a tool "T" is removably attached by means of a suitable clamping device such as a conventional collet chuck.

The drive motor 50 of the sub-motor unit 40 includes a rotor element 50a fixedly mounted on an intermediate portion of thereof, a stator element 50b attached to the inner wall of the housing 42 at a position confronting the rotor element 50a via a small air gap and electric power supply lines 50c connected to the stator windings of the stator element 50b to supply electric power from the external electric power supply lines to the stator windings.

The sub-motor unit 40 is also provided with a rotation detector 52 incorporated therein for detecting the rotating speed of the tool holding shaft 46, i.e., the rotating speed of the tool "T", and an angular position of the tool "T" attached to the tool holding shaft 46. The rotation detector 52 is connected to control signal lines 54 by which the detector 52 can receive control signals from the external controller (not shown) of the multi-function machine tool. The control signal lines 54 also transmit detection signals from the rotation detector 52 to the external controller.

The electric power supply lines 50c and the control signal lines 54 are collectively connected to an electric connector 56 which is attached to a predetermined position on the outer surface of the housing 42 of the sub-motor unit 40. The predetermined position of the connector 56 is selected so as to be suitably mated and electrically connected to a later-described electric connector 62 of the spindle head 10.

The sub-motor unit 40 can be attached to the end of the spindle 20 by the engagement of the female screw-thread portion 44a of the housing 42 with the male screw-thread portion 24 of the spindle 20. Namely, when the female screw-thread portion 44a of the housing 42 of the sub-motor unit 40 is initially brought into alignment with, and is then threadedly engaged with, the male screw-thread portion 24 of the spindle 20 by the rotation of the spindle 20 caused by the spindle motor 30, the sub-motor unit 40 can be easily attached to the end of the spindle 20. The sub-motor unit 40 can be removed from the end of the spindle 20 by unscrewing the female screw-threaded portion 44a of the housing 42 from the male screw-threaded portion 24 of the spindle 20.

In accordance with the present invention, a plurality of kinds of sub-motor units 40 are prepared and positioned at a suitable tool station arranged adjacent to the machine body 9 of the multi-function machine tool. At this stage, it should be understood that the respective sub-motor units 40 are provided with individual built-in drive motors 50 having different motor-performances, i.e., different rated speeds and output torques, Therefore, for example, a certain one of the plurality of sub-motor units 40 is provided with the drive motor 50 capable of exerting a high output torque at a low rated speed in order to rotate the tool "T" which is suitable for machining of a workpiece made of a non-free-cutting material such as iron system material, and another certain one of the plurality of sub-motor units 40 is provided with the drive motor 50 capable of exerting a low output torque at a high rated speed in order to rotate the tool "T" which is suitable for machining a workpiece made of a free cutting material such as an aluminum material or a plastic material. A further certain one of the plurality of sub-motor units 40 is provided with the drive motor 50 capable of exerting a low output torque at an extremely high rated speed in order to rotate the tool "T" consisting of a grinding tool. It should be understood that the tool "T" attached to the front end of each sub-motor unit 40 may be changed with a different tool in response to demand from the viewpoint of obtaining an optimum machining condition.

Further, the plurality of kinds of sub-motor units 40 are prepared so that a suitable one may be selected from the plurality of sub-motors 40 in response to a change in the machining conditions such as a rough machining condition, a finish machining condition, precision machining condition, a grinding machining condition and so on.

The multi-function machine tool of the present invention may be provided with a conventional automatic tool changer for storing a plurality of kinds of sub-motor units 40 in a suitable tool magazine and for exchanging the sub-motor units between the spindle 20 of the multi-function machine tool and the tool magazine in the same manner as the conventional automatic tool changer by using an automatic tool changing mechanism. When each sub-motor unit 40 is automatically attached to the tapered end 22 of the spindle 20 of the multi-function machine tool, the central tapered projection 44b of each sub-motor unit 40 can be effectively used for accurately fitting the end of the sub-motor unit 40 into the tapered end 22 of the spindle 20.

On the other hand, the sub-motor unit 40 may be, either manually or by the intervention of an industrial robot, attached to the front end of the spindle 20 of the multi-function machine tool when the machine tool is not provided with an automatic tool changer.

When the sub-motor unit 40 is attached to the front end of the spindle 20, the drive motor 50 and the rotation detector 52 must be connected to the external electric power source and the controller of the machine tool in order to receive the electric drive power and the electric control signals and to transmit the rotation-detection signals. Therefore, the spindle head 10 of the multi-function machine is provided with an L-shape support arm 60 for the supporting electric lines and a connector 62. The support arm 60 is pivotally attached to a suitable position of the housing 12 of the spindle head 10 such as a lowermost position of the housing 12 so as to swing about the fulcrum 60a, and accommodates therein electric lines including an electric power supply lines and control signal lines. When the support arm 60 is swung from a horizontal position to a vertical position adjacent to the front end of the spindle 20, the electric connector 62 supported by the support arm 60 can be connected to the afore-mentioned connector 56 of each sub-motor unit 40 so as to provide an electric connection between the electric lines of the support arm 60 and the electric power supply lines 50c and the control signal lines 54 of each sub-motor unit 40.

Figure 2:
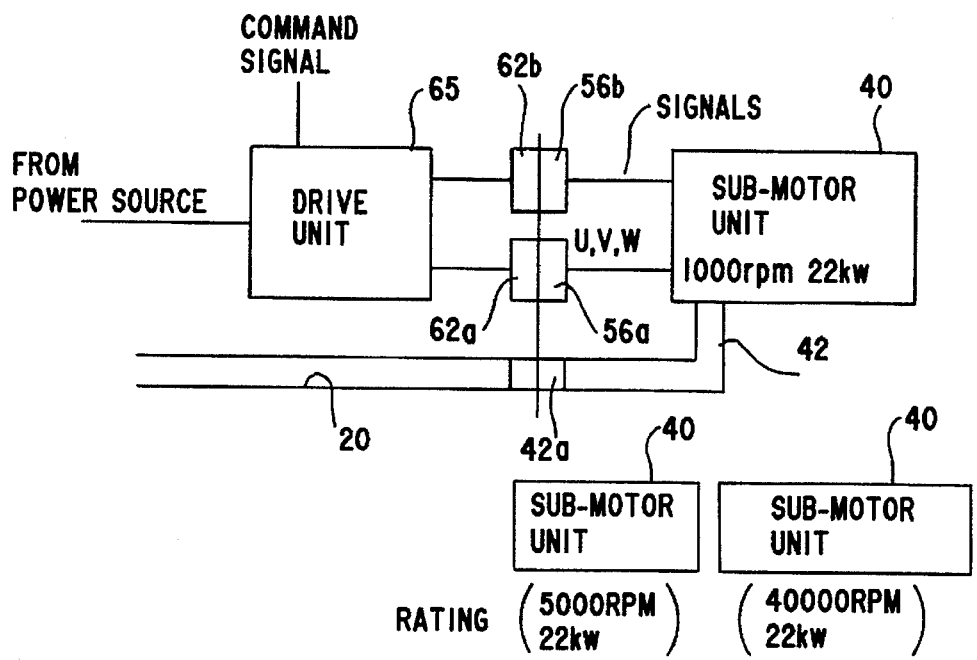
FIG. 2 is a block diagram illustrating the supply of electric power and cooling air to a sub-motor unit, and the transmission of control signals between a drive unit and the sub-motor unit.

FIG. 2 schematically illustrates a supply system for supplying the electric drive power to the drive motor 50 of each sub-motor unit 40, and for transmitting control signals between an external drive unit 65 and the drive motor 50 having therein the rotation detector 52. FIG. 2 also illustrates the supply of the cooling air from the spindle 20 to the attached sub-motor unit 40 via the air-pathway 20a in the spindle 20.

In FIG. 2, the drive unit 65 is either mounted in the machine body 9 (FIG. 1) of the multi-function machine tool or is arranged as an independent unit arranged beside the machine body 9, and contains therein a motor drive circuit and a control signal circuit. The motor drive circuit receives electric drive power from the power source arranged outside the machine body 9. The control signal circuit is connected to the control unit of the machine tool which is arranged outside the machine body 9. The drive unit 65 is constantly electrically connected to the afore-mentioned electric connector 62 of the support arm 60 which includes an electric power line connector 62a and a control signal connector 62b.

When the electric connector 62 of the support arm 60 is connected to the electric connector 56 of each sub-motor unit 40 which contains an electric power line connector 62a and a control signal connector 62b (see FIG. 1), the drive motor 50 of each sub-motor unit 40 can be supplied with the electric drive power and the control signals which satisfy the requirement from the output performance of the drive motor 50. Further, when each sub-motor unit 40 is attached to the front end of the spindle 20, the unit 40 can be supplied with the cooling air fed through the air-pathway 20a, and via the plurality of through-holes 44c. The cooling air applies a cooling effect to both the drive motor 50 and the tool "T" attached to the front end of the tool holding shaft 46 of the sub-motor unit 40 when the sub-motor unit 40 is in operation.

FIG. 2 further illustrates that the drive motor 50 of the sub-motor unit 40 presently attached to the end of the spindle 20 of the spindle head 10 has a rated speed of 1,000 R.P.M., and a rated output power of 22 Kw. On the other hand, the drive motors 50 of the sub-motor units 40 which are stored in the tool storing station arranged adjacent to the machine body 9 have rated speeds of e.g., 5,000 R.P.M. and 4,000 R.P.M., and rated output torques of 22 Kw.

Figure 3A:
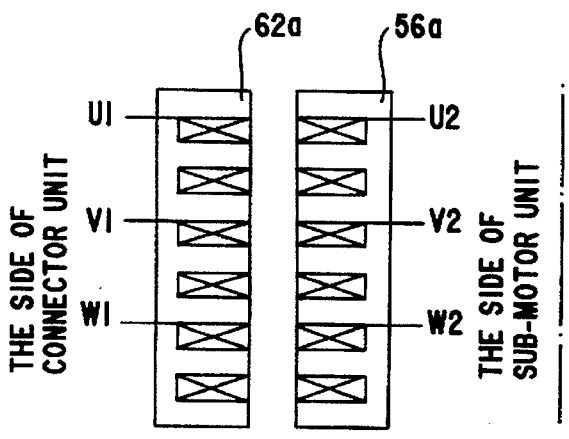
FIG. 3A is a schematic diagram illustrating an example of an electric connector, i.e., a magnetically connected connector to provide a mechanical and electrical connection between the connector unit and the electric windings of the drive motor of the sub-motor unit, in the state where the electric connection is separated.
Figure 3B:
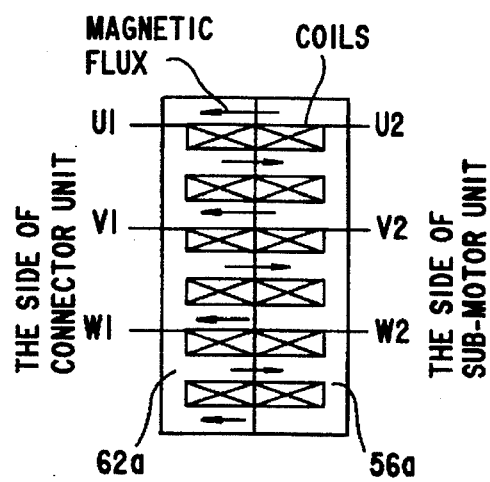
FIG. 3B is a schematic diagram, of the electric connector, illustrating the state where the electric connection is completed by the use of a magnetic attractive force.
Figure 4:
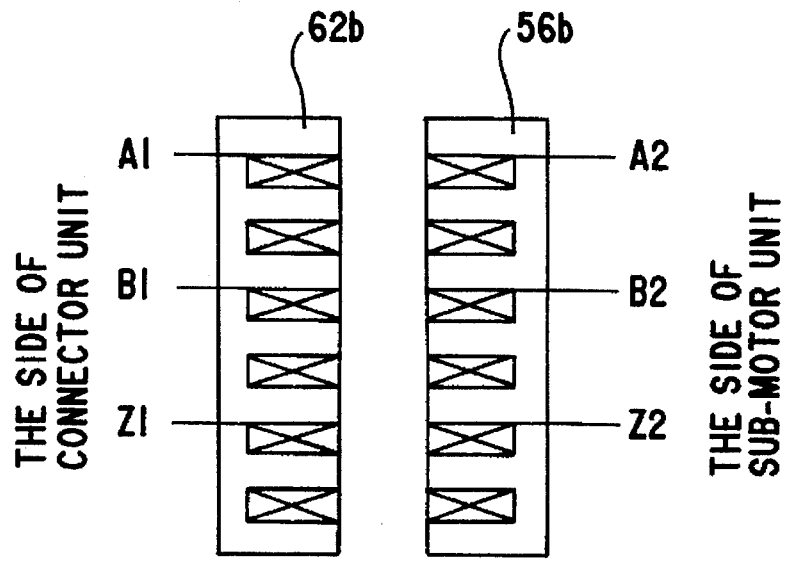
FIG. 4 is a schematic diagram illustrating an example of an electric connector, i.e., a magnetically connected connector, to conduct transmission of control signals between the connector unit and the drive motor of the sub-motor unit, in the state where the electric connection is separated.

FIGS. 3A, 3B, and 4, illustrate an example in which the electric connector 62 (62a;62b) of the support arm 60 of the spindle head 10 can be connected to the electric connector 56 (56a;56b) of each sub-motor unit 40 by using a magnetic attractive force. Namely, when the support arm 60 is swung down to the position adjacent to the lowermost end of the spindle 20 to which one of the sub-motor units 40 is attached, the electric connector 62 of the support arm 60 comes to a position suitable for being connected to the electric connector 56 of the attached sub-motor unit 40, and the two electric connectors 56 and 62 are mutually connected together by the use of magnetic attractive force of either a non-illustrated permanent magnet or electro-magnet embedded in the end faces of the electric connectors 56 and 62. The arrows in FIG. 3B typically indicate the magnetic flux flowing through the electric connectors 56 and 62 to produce the above-mentioned magnetic force.

When the two electric connectors 56 and 62 are mutually connected, electric primary windings received in the connector 62 are inductively connected to electric secondary windings received in the connector 56. Namely, electrically induced voltages appear in the secondary windings of the connector 56 which are directly related to the electric voltages applied to the primary windings of the connector 62, and accordingly, the electrically induced voltages of the secondary windings of the electric connector 56 supply the electric drive power and the control signals to the drive motor 50 and the rotation detector 52, respectively.

At this stage, it should be understood that in FIG. 3A, part of an electric three-phase transformer of the power line connector 62a of the electric connector 62, having three-phase windings U1, V1, and W1, is electrically separated from another part of the electric three-phase transformer of the power line connector 56a of the electric connector 56, having three phase windings U2, V2, and W2, but in FIG. 3B, the part of the electric three-phase transformer of the connector 62 is inductively connected to the part of the electric three-phase transformer in the connector 56. Similarly, FIG. 4 illustrates that part of the signal line transformer having three windings A1, B1, and Z1 of the electric signal line connector 62b of the electric connector 62 is separated from part of the transformer having three windings A2, B2, and Z2 of the electric signal line connector 56b of the electric connector 56, but that the parts are inductively electrically connected to one another by the use of the afore-mentioned magnetic attractive force.

Figure 5:
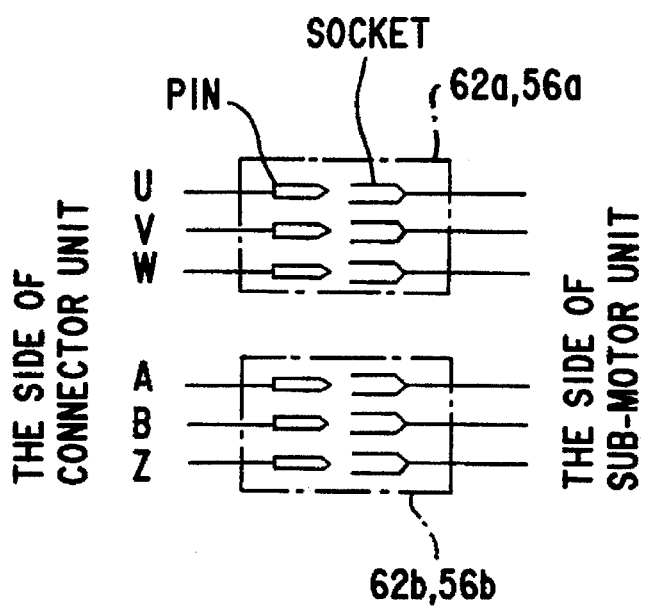
FIG. 5 is a schematic diagram illustrating an another example of an electric connector, i.e., a pin-and-socket type electric connector, to conduct supply of the electric power to the drive motor, and transmission of control signals between the connector unit and the drive motor of the sub-motor unit.

FIG. 5 illustrates a different embodiment in which the electric connector 62 of the support arm 60 of the spindle head 10 may be electrically connected to and disconnected from the electric connector 56 of the sub-motor unit 40 by using a mechanical pin-and-socket mechanism.

From the foregoing description of the preferred embodiments of the present invention, it will be understood that according to the multi-function machine tool of the present invention, the plurality of kinds of sub-motor units having different output performances are prepared for a multi-function machine tool provided with a single spindle head receiving a rotating spindle, and can be changeably and removably attached to the end of the spindle. Further, the spindle head is provided with the electric connector means which can electrically and mechanically connect to the electric connector of each of the plurality of kinds of sub-motor units in an accurate and automatic manner. Thus, the multi-function machine tool is able to perform a plurality of kinds of machining operations by using the sub-motor units in addition to a tool directly attached to the spindle and driven by the spindle motor, in response to changes in the machining conditions, and in the materials of workpieces to be machined.

Many modifications and variations will occur to persons skilled in the art without departing from the spirit and scope of the invention claimed in the accompanying claims.

What we claim:

1. A multi-function machine tool, comprising:
  a spindle head, configured to be selectively engaged with one of a plurality of sub-motor units, each of the plurality of sub-motor units comprising (a) a tool, located at a front end thereof, for machining a workpiece, (b) a tool mount, provided at a rear end thereof, (c) a built-in drive motor for driving the tool at an individual drive condition to conduct one of a plurality of machining operations, and (d) an electric connector unit for receiving electrical power for the drive motor and for receiving and transmitting control signals,
  the spindle head comprising (a) a spindle which is rotatably received by the spindle head and has a front tool receiving end, (b) a spindle motor which is mounted on the spindle head for driving the rotation of the spindle, (c) engaging means for disengageably engaging the spindle head with the tool mount of one of the plurality of sub-motor units, and (d) electric and mechanical connector means, located adjacent an end of the spindle head, for mechanically and electrically disengageably connecting the spindle head to one of the plurality of sub-motor units.

2. A multi-function machine tool according to claim 8, wherein each of said plurality of sub-motor units is provided with a hollow housing receiving said drive motor therein, and rotatably supporting therein a tool-holding shaft to hold said tool, said housing having an internal axial air-path substantially in alignment with said spindle for introducing a flow of cooling air supplied through said spindle head of said multi-function machine tool into a working portion of said tool of said each sub-motor unit.

3. A multi-function machine tool according to claim 2, wherein said tool mount of said each sub-motor unit comprises a female thread portion and a tapered end coaxially formed in a rear end of said housing of said each sub-motor unit, and
  wherein said engaging means comprises a male thread portion and a tapered bore portion coaxially formed in said front tool receiving end of said spindle, said male thread portion being engageable with said female thread portion of said each sub-motor unit, and said tapered bore portion snugly receiving said tapered end of said each sub-motor unit.

4. A multi-function machine tool according to claim 2, wherein said tool of said each sub-motor unit can be changeably attached to said tool-holding-shaft, and is changed in response to a change in the machining conditions for machining the workpiece.

5. A multi-function machine tool according to claim 1, wherein said electric connector means of said machine tool comprises an arm element pivotally connected to said spindle head at a position adjacent to said front tool receiving end of said spindle and having an end on which an electric connector unit is mounted so as to be mechanically and electrically connected to said electric connector unit of said each sub-motor unit when said each sub-motor unit is mounted on said spindle, said electric connector unit having electric power supply and control signal lines accommodated in said arm element.

6. A multi-function machine tool according to claim 5, wherein said electric connector unit of said electric connector means and said electric connector unit of said each sub-motor unit are constructed so as to be electrically inductively connected to one another when said both electric connector units are mechanically connected by a magnetic attractive force.

7. A multi-function machine tool according to claim 5, wherein said electric connector unit of said electric connector means and said electric connector unit of said each sub-motor unit are constructed so as to be connected to one another by a mechanical pin-and-socket mechanism.

* * * * *